United States Patent
Andersen et al.

(10) Patent No.: US 6,738,955 B2
(45) Date of Patent: May 18, 2004

(54) METHOD AND SYSTEM FOR FORMAL CHARACTERIZATION OF AVERAGE PERFORMANCE

(75) Inventors: Flemming Andersen, Austin, TX (US); Jason Raymond Baumgartner, Austin, TX (US); Steven Leonard Roberts, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 09/726,283

(22) Filed: Nov. 30, 2000

(65) Prior Publication Data

US 2002/0099982 A1 Jul. 25, 2002

(51) Int. Cl.$^7$ .......................... G06F 17/50; G06F 9/455; G06F 15/16
(52) U.S. Cl. ................. 716/4; 703/16; 703/17; 703/21; 703/22; 703/28; 717/104; 717/126; 717/128; 717/135; 709/201
(58) Field of Search ............... 716/4; 703/16, 703/17, 21, 22, 28; 717/104, 126, 128, 135; 709/201

(56) References Cited

U.S. PATENT DOCUMENTS

| | | | |
|---|---|---|---|
| 5,394,347 A | * 2/1995 | Kita et al. | 703/2 |
| 5,454,102 A | * 9/1995 | Tang et al. | 707/3 |
| 5,708,594 A | * 1/1998 | Iwashita et al. | 703/21 |
| 5,960,200 A | * 9/1999 | Eager et al. | 717/147 |
| 6,278,963 B1 | * 8/2001 | Cohen | 703/17 |
| 6,366,875 B1 | * 4/2002 | Colizzi et al. | 703/16 |
| 6,446,241 B1 | * 9/2002 | Mobley et al. | 716/4 |
| 6,526,561 B2 | * 2/2003 | Yokoyama et al. | 716/18 |

FOREIGN PATENT DOCUMENTS

| | | | |
|---|---|---|---|
| JP | 58181158 A | * 10/1983 | G06F/11/28 |

OTHER PUBLICATIONS

Fischer et al., "An Integration of Deductive Retrieval into Deductive Synthesis", 14th IEEE International Conference on Automated Software Engineering, Oct. 12, 1999, pp. 52–61.*
NB9006145, "Technique for Parallel Trace–Driven Cache Simulation", IBM Technical Disclosure Bulletin, vol. 33, No. 1B, Jun. 1990, pp. 145–146 (5 pages).*
NN9412545, "Converting Between Object Oriented and Workflow Graph Views of Processes", IBM Technical Disclosure Bulletin, vol. 37, No. 12, Dec. 1994, pp. 545–546 (4 pages).*
NN9411347, "Parallel Simulation of Multiprocessor Caches", IBM Technical Disclosure Bulletin, vol. 37, No. 11, Nov. 1994, pp. 347–352 (12 pages).*
NN9205441, "Non–Interrupt Masking Trace Record Allocation", IBM Technical Disclosure Bulletin, vol. 34, No. 12, May 1992, pp. 441–445 (8 pages).*

* cited by examiner

Primary Examiner—Vuthe Siek
Assistant Examiner—Phallaka Kik
(74) Attorney, Agent, or Firm—Duke W. Yee; Mark E. McBurney; Christopher P. O'Hagan

(57) ABSTRACT

A method for characterizing average performance in a data processing system is provided. This method consists of adding meta-tool level variables to a verification tool. These meta-tool variables keep track, at once, of all concurrent streams of execution that the tool is considering in its reachability analysis. The image of an initial state variable is found and then divided into a frontier of new states and a set of previously reached states. The previously reached states are ignored and the image of the frontier is found. This process continues until the frontier is empty and all possible states have been reached. In one embodiment of the present invention, the probabilities of the paths can be considered by sampling and holding input data using SMV (a model checking tool) variables.

21 Claims, 2 Drawing Sheets

METHOD AND SYSTEM FOR FORMAL CHARACTERIZATION OF AVERAGE PERFORMANCE

BACKGROUND OF THE INVENTION

1. Technical Field

The present invention relates to evaluating the performance of data processing systems. More specifically, the present invention relates to quantifying average performance characteristics.

2. Description of Related Art

Performance metrics attempt to quantify some aspect of system performance, examples include load latencies, cycles-per-instruction measurements, cache hit ratios, and arbitration delay and/or fairness. In extreme cases, performance problems may even yield livelock/deadlock conditions, in which the system gets "stuck" and can make no forward progress in an execution.

Most performance evaluations are calculated with respect to a set of specific test, sometimes referred to as a benchmark. Such evaluations consider aspects such as minimum values, maximum values, and average values of the performance metric. While such evaluation procedures are easy to visualize, and are quite useful with a meaningful set of tests, they suffer from not providing insight into true system performance with respect to any arbitrary test. Consequently, tests may fail to consider sequences of execution which expose worst-case behavior of the design under test. This fundamental limitation has been noted by many in the industry.

Formal verification is a rigorous validation approach; it uses mathematical reasoning to exhaustively verify the correctness of the design under test. It may reason about possibly infinite streams of execution, and in being exhaustive it may fully characterize the design under all possible streams of execution. The non-determinism supported by formal verification tools renders formal methods an attractive option for performance characterization.

Formal methods may be used to characterize absolute worst-case and best-case system performance. However, there is no manner in which a model checking framework will allow measurement of average performance along all paths. While model checking is a branching-time framework, allowing quantification at any point in time over "any path" or "all paths", it does not allow counting of these paths. Furthermore, model checkers typically do not consider the probability of a path. Typically they count a transition with probability 1/100,000 than same as a transition with probability 99999/100,000. Thus, model checkers are quite different than simulators (where the transition with probability 1/100,000 is not likely to ever be considered).

Therefore, an enhancement to existing formal verification tools that would allow direct characterization of average performance would be desirable.

SUMMARY OF THE INVENTION

The present invention provides a method for characterizing average performance in a data processing system. This method consists of adding meta-tool level variables to a verification tool. These meta-tool variables keep track, at once, of all concurrent streams of execution that the tool is considering in its reachability analysis. The image of an initial state variable is found and then divided into a frontier of new states and a set of previously reached states. The previously reached states are ignored and the image of the frontier is found. This process continues until the frontier is empty and all possible states have been reached. In one embodiment of the present invention, the probabilities of the paths can be considered by sampling and holding input data using SMV (a model checking tool) variables.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
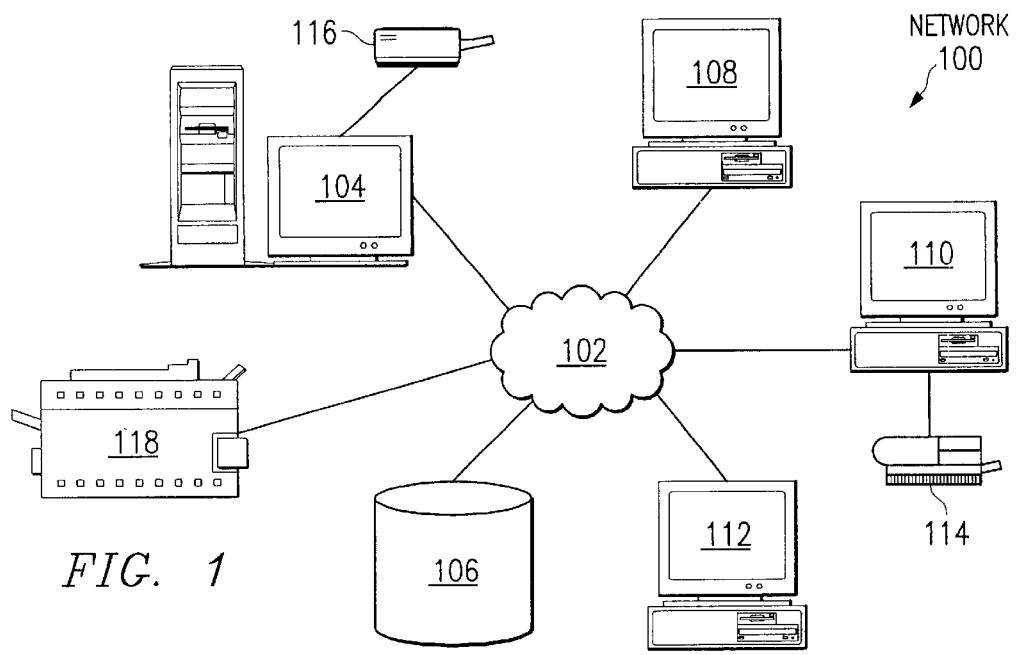
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections. In the depicted example, server 104 is connected to network 102, along with storage unit 106. In addition, clients 108, 110 and 112 are also connected to network 102. These clients, 108, 110 and 112, may be, for example, personal computers or network computers.

For purposes of this application, a network computer is any computer coupled to a network that receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
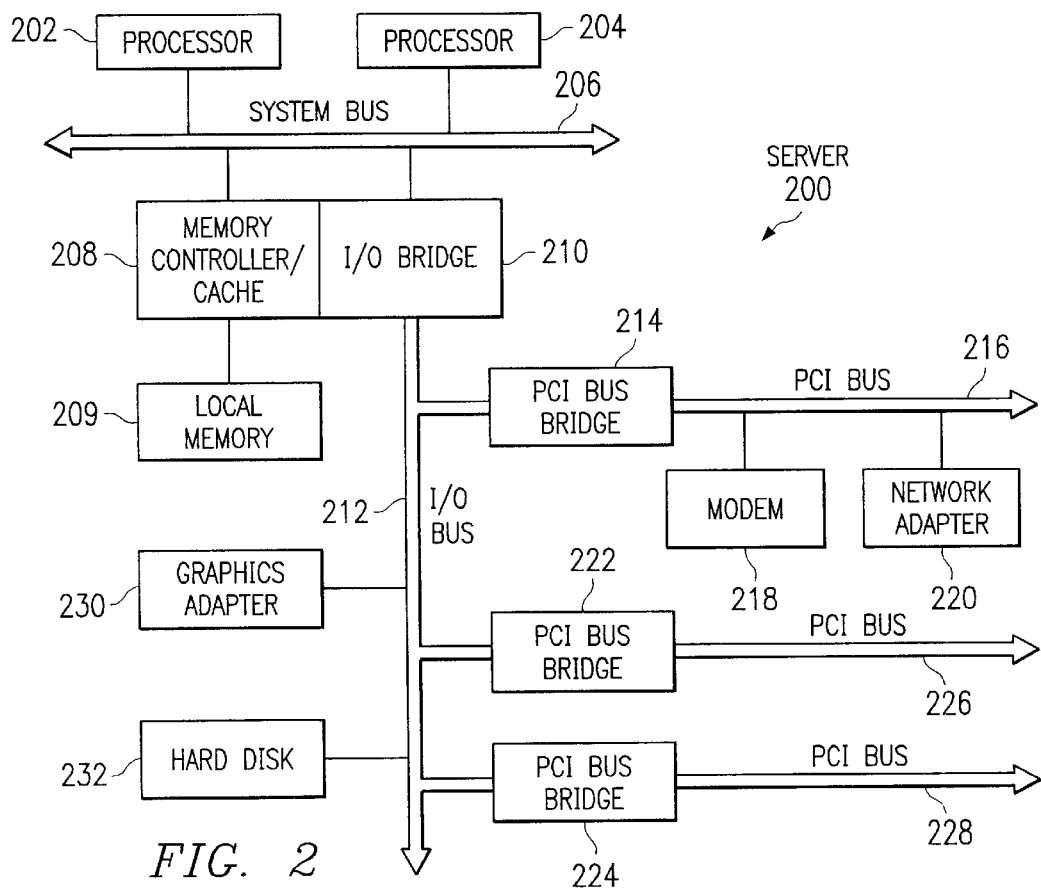
FIG. 2 depicts a block diagram of a data processing system which may be implemented as a server, in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
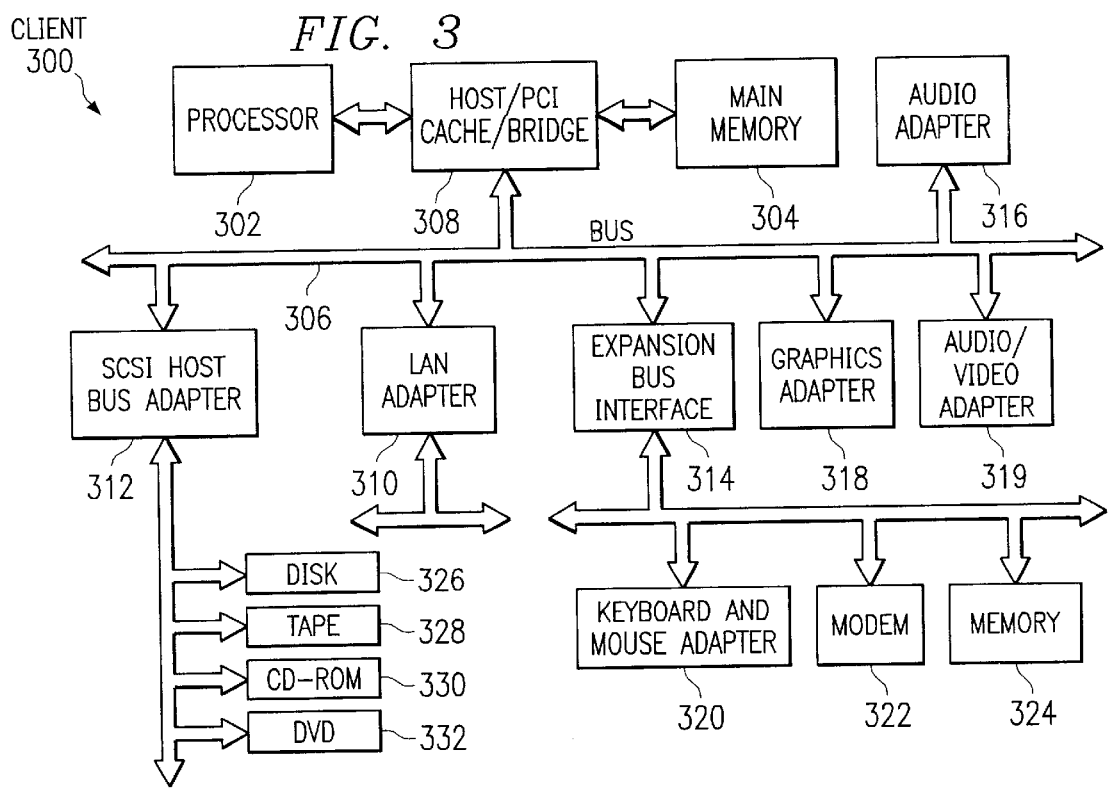
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as AIX, which is available from International Business Machines Corporation. "AIX" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

There are two types of counting, for example, which can be considered for characterizing most cases of performance analysis. In characterizing the average request-to-grant latency along all paths, two counters are needed to accomplish this: one for the number of grants given (along all paths), and another for the total latencies taken to issue these grants (along all paths). A simple division would yield the average latency. While model checkers allow one to create such counters which count grants or latency sums along a single path, there is no way to specify, for example, that a counter variable should count the latencies of all grants given in all possible next cycles.

The present invention introduces a meta-tool level variable (metavar), rather than one which will be composed with the design (which will by necessity only reason about a singe path, which is the limit of the current state of the art). The following illustrates two examples for using the meta-tool variable with SMV syntax. (SMV is an established freeware model checker from CMU.)

The example below describes a system comprising one arbiter, and two devices: D0 and D1 (The equivalent modeling for D1 is not shown, though it is equivalent to the example below, except replacing all "0" with "1".)

The first example adds the keyword METAVAR to declare the meta-tool level variable, which will be assumed to be a very long integer. Note that this variable will not cause an exponential blowup of the verification process, being at the tool level rather than as a counter composed into the problem domain, as with the current state of the art. Consider the following example (assuming that the maximum latency has been identified using existing techniques; if infinite, note that the division will be useless):

```
VAR
  latency_count : 0 . . MAX_LAT;
ASSIGN
  init(latency_count) :=0;
  next(latency_count) :=case
    GNT0: 0
    REQ0 & (latency_count<MAX_AT) :=latency_count+1;
    --if(latency_count>MAX_LAT) ,
    --our MAX_LAT is incorrect . . .
    else: latency_count;
  esac;
METAVAR
  count1, count2;
ASSIGN
  init(count1) :=0;
  init(count2) :=0;
  next(count1) := count1 + GNT0;
  next (count2) := case
    GNT0: count2 + latency_count;
    else: count2
  esac;
```

This example counts the number of grants given to D0. REQ0 indicates that D0 is requesting a grant. The grant is denoted GNT0.

Note that "latency_count" is introduced as an auxiliary environment variable. As defined, count2 divided by count1 yields the average grant latency for D0.

A second example that illustrates this performance characteristic method examines a "cache hit" ratio, which measures how many accesses there are of a certain classification. This is simpler, in that it does not require the "latency_count" state variables as in the first case:

```
METAVAR
  count1, count2
ASSIGN
  init(count1):=0;
  init(count2):=0;
  next(count1):=count1+access_occurred;
  next(count2):=count2+access_was_hit;
```

Dividing count2/count1 now yields the average hit ratio across all paths.

It is important to clarify the term "along all paths". The following explanation assumes that the verification tool is a symbolic model checker; others may work just as easily.

Figure 4:
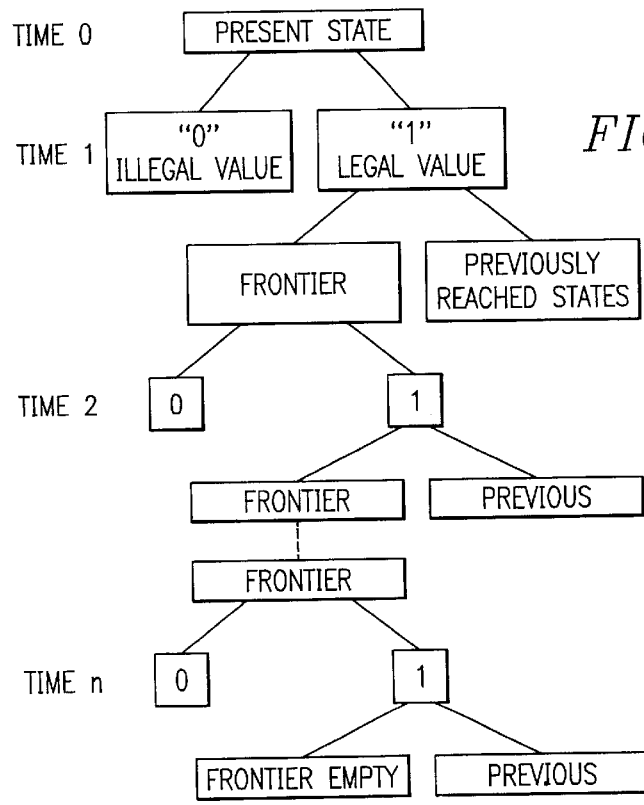
FIG. 4 depicts a diagram illustrating a symbolic model checker in accordance with the present invention.

Referring now to FIG. 4, a diagram illustrating a symbolic model checker is depicted in accordance with the present invention. Model checkers start in the "initial state" of the design. In general, there may be multiple initial states possible for the design. Model checkers then calculate symbolically the set of all states which may be reached in one "step" from the initial state. The model and states are represented using Binary Decision Diagrams (BDD's), which are useful for symbolic computations. These are 2-child trees. Each "level" represents a variable of the problem (i.e. a state variable or latch of the model being verified). The left "child" represents an assignment of a "0" to the corresponding variable, and the right represents an assignment of a "1". The leaves correlate to a constant "0" or "1". A root-to-1 path (sometimes called a "minterm") means that the corresponding valuation of variables is legal, and a root-to-0 path means that the path is illegal.

BDD's are used to represent sets of states (which are nothing more than valuations to the state variables of the model), in addition to the "next-state function" of the design, which is a BDD with twice the number of state variables of the design; one set represents "present state" variables and the other represents "next states". For BDD's representing states, a root-to-1 path means that the corresponding state is in the set. For BDD's representing the next-state function, a root-to-1 path means that the corresponding present state may transition (under some input) to the corresponding next state. The next-state function, represented on a BDD, is sometimes called the Transition Relation.

The tool plugs a set of present states into a Transition Relation and gets out a set of next states. This set of next states is sometimes called the "image" of the present states, which is a mathematical term for the range of a given domain passed into a function. Everything is represented on BDD's for speed and better scalability. For example, there may be $10^{30}$ states, though the BDD may be small and the next states from these $10^{30}$ initial states can be evaluated in one operation rather than $10^{30}$ operations.

Therefore, whenever a set of next states is calculated, this set can be partitioned into two. The first subset represents those states which have previously been reached (i.e. those states which match present states or previously considered states). These can be discarded by the tool, since they (and their successors) have already been considered. The second set represents the "new states" which need to be considered. This set is called the "frontier".

The tool begins with the initial set (the states reachable at time 0) and finds all states reachable at time 1. The tool then prunes this set down to the frontier and then finds the image of this frontier (the states reachable at time 2). This process continues until an empty frontier is reached. At this point, all reachable states have been enumerated by the tool.

Basically, one pair of sets will be formed for each variable/expression that triggers the metavar to change (if not explicitly a free-running update). The metavars can be updated efficiently by adding "large numbers" representing the cardinality of BDDs representing subsets of states. Instead of performing a sweep over the BDD incrementing by one, a possibly exponential number of times, the cardinality of the BDD is added to the metavar just once.

In the first example cited above, the set of reached states is partitioned into two sets: one where GNT0=1 and one where GNT=0. The cardinality of the BDD for this first set (where GNT0=1) is added to count1. For count2, the BDD is further partitioned into subsets for each valuation of latency_count. Count2 is then updated by the cardinality of each subset multiplied by the valuation of latency_count in that subset.

In the second example cited above, the tool extracts the set of reached states where access_occurred=1. The cardinality of this subset is added to count1. The tool then extracts the set of reached states where access_was_hit=1, and adds the cardinality of this subset to count2.

In this manner, though the number of reached states may be very large, evaluation of the metavars is very efficient. Note that rather than updating the metavars only once, after the frontier process is complete and the full set of reached states is already evaluated, the updating of the metavars can occur "on the fly" as each frontier is calculated.

BDD's are typically compact representations of design information. For example, a design with N latches (electronic circuits that maintain one of two states) may have $2^N$ reachable states. If N is greater than 32, this may be impossible to represent in the main memory of a 32-bit computer. But a BDD, which is typically kept compressed, can typically encode the reachable states of designs with 80–300 state variables.

Nevertheless, this indicates an exponential blowup of the number of reachable states versus design size (number of latches). The number of latches includes latches in the logic being verified (for example, from VHDL or Verilog), in addition to any state variables created by the user of the formal verification tool (in the present example, these are variables declared with the VAR keyword in SMV). The next-state function discussed above, in addition to the state sets (i.e. frontier), is part of the composition of the state variables from the VHSIC Hardware Description Language (VHDL) in addition to those declared in SMV language to help model the problem for SMV.

The VHDL variables are model state variables, and the counter is a SMV state variable. Note that the present invention relies upon the use of metavars, which are neither model state variable nor SMV state variables. Metavars exist only at the tool level. Therefore, they do not entail an exponential blowup. They are used to keep track "at once" for "all concurrent streams of execution" that the model checker is considering in its reachability analysis.

A state is a unique valuation (0 or 1) to the state variables of the "verification problem". Note that the symbolic model checker in the present invention throws away states from the image if they have already been reached, and preserves only the frontier of new states. It is possible that two or more paths (following a different sequence of states) will converge upon the same state, hence the model checker will only consider one path "through" every state. However, there can be no convergence of two states with different valuations of the counter, since this is a state variable. Therefore, best-case and worst case paths cannot be masked.

One note on this is the notion of "average over all possible paths". The notion of "all possible paths" is somewhat vague, since considering all possible paths of finite or infinite length will yield an infinite set. So the reasoning is limited to paths comprised of "unique states". Due to the way in which model checking operates, if a portion of the frontier of new states has been previously encountered, it is discarded by the tool and no behavior is lost. Hence two convergent paths will be ultimately (downstream of the convergence) counted as one if they are the same "length" with respect to the latency criteria. This "if" is due to the fact that the SMV "latency_count" counters will be composed with the design, so two states will only appear identical if the model state variable and the counter have equivalent values. However, since all non-convergent paths will be counted, the average estimate will be much more accurate than that achievable from running a set of benchmark tests. Since state variables utilized for environment/specification definition are composed into the design, it is guaranteed that no convergence will ever mask a worst-case or best case performance scenario.

This approach will, however, be likely to yield a different answer than "exhaustive probabilistic simulation" in that model checkers typically discount path probabilities, and consider all paths equivalently. In practice this can often be minimized by adding state variables to the problem. For example, assuming that there is a 10-bit data vector input to the design. If this value is all 0's, then a latency-of-10 path will be entered, otherwise a latency-of-3 path will be chosen. The probability of the latency-of-10 path is $1/(2^{10})$. The probability of the latency-of-3 path is $1-1/(2^{10})$. Exhaustive simulation would yield an average probability very near 3, whereas the present approach would yield 6.5.

This example makes more sense in light of the discussion above. Two states can be converged only if they are the same. By adding state variables to the problem, such convergence might be minimized, as convergence now has to consider equivalence over these new variables in addition to the old ones.

The present example mentions that the design will take one path, which will entail a latency of 10, if a 10-bit input vector takes the values 0000000000b. Else (for the $(2^{10})-1$ other valuations of that input vector), it will take a latency-of-3 path. If the design is simulated randomly, it will presumably choose 0000000000b as often as any of the other $(2^{10})-1$ values. Therefore, $((2^{10})-1)/(2^{10})$ of the time, the design will encounter a latency of 3, and $1/(2^{10})$ of the time, it will encounter a latency of 10.

In model checking, all possible input vectors are chosen regardless of probability. So if the design within the model checker does not include state variables to latch this 10-bit input, it "may" consider the latency-of-3 path equivalently with the latency-of-10 path. Since the input is not a state variable, all paths which enter the latency-of-3 sequence of states may converge upon the same state, and hence only be counted once. And only one path enters the latency-of-10 sequence, so this will be counted once. Therefore, $(10+3)/2=6.5$ may be the result. Whereas counting the probability of the inputs, would yield $(10+((2^{10})-1)*3)/(2^{10})$, which is near 3.

However, if it is assumed that the data is sampled and held during the latency, there will be no "convergence" of these paths; the latency-of-10 path will be only one of $2^{10}$ possible paths, and the latency-of-3 path will be counted $1-(1/(2^{10}))$ times. Thus, in this case, the present approach, like simulation, will yield an answer very near 3. In this manner, the present approach may be used to consider probabilities of paths. Note, however, that if these extra state variables are not already part of the design under test, the user of the tool must add them via SMV, and these state variables will further increase computational complexity of the model checking run. By sampling and holding the input causing a transition into the latency-of-3 or latency-of-10 path, using SMV variables, then each possible valuation of the 10-bit input will be considered distinctly. The $(2^{10})-1$ input vectors which enter the latency-of-3 path will not then be treated the same (since the input vector will be part of the state space) and convergence will not occur. So the model checker would correctly calculate the result (in effect, considering the probability of the inputs) and yield the answer near 3.

This approach cannot capture arbitrary probabilities. For example, the user cannot query as to average latency if an external interrupt is pulled with a probability of 1%.

A power-of-two weighting can be forced by introducing state variables as above, though this will not handle arbitrary probabilities. Nevertheless, this approach is exhaustive and much more computationally efficient than existing probability-based performance analysis tools. The example above shows that by introducing new state variables, it is possible to prevent (or minimize) convergence which otherwise may "forget" the probability of paths. But by introducing new state variables, typically, only probabilities which are powers of two (since N latches may encode $2^N$ state) are captured. But if a designer wants to weigh as a probability of 1%, which is not a power of two, this cannot readily be done by latching input bits. There are possible ways of handling this problem, such as adding a SMV variable which can take values 1 to 100 (there is no need for SMV variables to be binary). Designers of a piece of logic are often interested in knowing such average data with little regard for input probability. At the block-level, notions of "this input is only pulled with a probability of X" typically are nonexistent, since the block is isolated from its real chip-level environment for focused testing. This experience has been the motivation for developing this solution, to allow designers to ascertain average-case performance of their logic blocks.

This new tool would allow for more efficient performance analysis than existing path probabilistic analysis tools, and allow for a more exact calculation than the simulation-based methods common in industry today, since simulation is far from exhaustive.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for characterizing average performance in a data processing system, comprising:
   adding a meta-tool level variable to a verification tool;
   finding an image of an initial state variable;
   dividing the image into a frontier and a set of previously reached states;
   ignoring the previously reached states;
   finding the image of the frontier; and
   repeating said steps of dividing, ignoring and finding the image of the frontier, until the frontier is empty.

2. The method according to claim 1, further comprising calculating probabilities of paths by sampling and holding input data.

3. The method according to claim 1, wherein a value of the meta-tool level variable is updated by adding cardinality of subsets of reached states.

4. The method according to claim 3, wherein the value of the meta-tool level variable is computed with a symbolic verification tool.

5. The method according to claim 4, wherein the symbolic verification tool is a Binary Decision Diagram-based tool.

6. The method according to claim 1, wherein a value of the meta-tool level variable is updated after each iteration.

7. The method according to claim 1, wherein a value of the meta-tool level variable is updated after all reachable state sets are complete.

8. A computer program product in a computer readable medium for use in a data processing system, for characterizing average performance in a data processing system, the computer program product comprising:
   instructions for adding a meta-tool level variable to a verification tool;
   instructions for finding an image of an initial state variable;
   instructions for dividing the image into a frontier and a set of previously reached states;
   instructions for ignoring the previously reached states;
   instructions for finding the image of the frontier; and
   instructions for repeating said dividing, ignoring and finding the image of the frontier, until the frontier is empty.

9. The computer program product according to claim 8, further comprising instructions for calculating probabilities of paths by sampling and holding input data.

10. The computer program product according to claim 8, wherein a value of the meta-tool level variable is updated by adding cardinality of subsets of reached states.

11. The computer program product according to claim 10, wherein the value of the meta-tool level variable is computed with a symbolic verification tool.

12. The computer program product according to claim 11, wherein the symbolic verification tool is a Binary Decision Diagram-based tool.

13. The computer program product according to claim 8, wherein a value of the meta-tool level variable is updated after each iteration.

14. The computer program product according to claim 8, wherein a value of the meta-tool level variable is updated after all reachable state sets are complete.

15. A system for characterizing average performance in a data processing system, comprising:
   means for adding a meta-tool level variable to a verification tool;
   means for finding an image of an initial state variable;
   means for dividing the image into a frontier and a set of previously reached states;
   means for ignoring the previously reached states;
   means for finding the image of the frontier; and
   means for repeating said dividing, ignoring and finding the image of the frontier, until the frontier is empty.

16. The system according to claim 15, further comprising means for calculating probabilities of paths by sampling and holding input data.

17. The system according to claim 15, wherein a value of the meta-tool level variable is updated by adding the cardinality of subsets of reached states.

18. The system according to claim 17, wherein the value of the meta-tool level variable is computed with a symbolic verification tool.

19. The system according to claim 18, wherein the symbolic verification tool is a Binary Decision Diagram-based tool.

20. The system according to claim 15, wherein a value of the meta-tool level variable is updated after each iteration.

21. The system according to claim 15, wherein a value of the meta-tool level variable is updated after all reachable state sets are complete.

* * * * *